United States Patent [19]

Beck et al.

[11] 4,267,967
[45] May 19, 1981

[54] TWO-SPEED AUTOMATIC CONTROL OF SUPPLY FANS

[75] Inventors: Joseph H. Beck, North Merrick; Paul F. Orilio, Brooklyn, both of N.Y.

[73] Assignee: J.C. Penney Company Inc., New York, N.Y.

[21] Appl. No.: 937,163

[22] Filed: Aug. 28, 1978

[51] Int. Cl.³ .................... F24F 7/00; G05B 5/00
[52] U.S. Cl. ...................... 236/49; 236/DIG. 9; 318/334
[58] Field of Search .............. 236/49, 78 D, 1 ER, 236/84, 79, DIG. 9; 318/334

[56] References Cited

U.S. PATENT DOCUMENTS

| | | | |
|---|---|---|---|
| 2,154,543 | 4/1939 | Swanson | 318/334 X |
| 2,432,215 | 12/1947 | Stocker | 236/84 |
| 2,753,119 | 7/1956 | Stunkard | 236/49 |
| 3,010,289 | 11/1961 | Kuklinski | 62/226 X |
| 3,034,314 | 5/1962 | Canter | 62/180 |
| 3,171,471 | 3/1965 | Blum | 62/141 |
| 3,653,589 | 4/1972 | McGrath | 236/49 |
| 3,877,243 | 4/1975 | Kramer | 62/180 |
| 3,896,359 | 7/1975 | Olander et al. | 318/334 |
| 3,959,979 | 6/1976 | Kramer | 62/180 |
| 4,146,086 | 3/1979 | Hobbick et al. | 62/180 |

*Primary Examiner*—William E. Wayner
*Assistant Examiner*—Harry B. Tanner
*Attorney, Agent, or Firm*—Daniel N. Calder

[57] ABSTRACT

The control system maintains air temperature comfort in a zone of a commercial structure. Outside air is supplied into the zone for ventilation purposes and for cooling the zone to the desired temperature whenever possible to minimize the use of mechanical air cooling apparatus and thereby reducing energy consumption. Heating and cooling coils temperature condition the supplied air. A pneumatic control system selectively activates the heated, cooled or ventilated air supplied in the zone. A two-speed supply fan, controlled by the pneumatic control system, operates in a first state at only low speed to reduce energy consumption, or in a second state at automatic thermostat two-speed control (high or low). The fan in this second state operates at low speed except when maximum cooling is required and then switches back to low speed operation from high speed when the ambient temperature in the zone approaches the desired temperature.

10 Claims, 2 Drawing Figures

TWO-SPEED AUTOMATIC CONTROL OF SUPPLY FANS

BACKGROUND AND SUMMARY OF THE INVENTION

The invention is in the field of control systems for maintaining air temperature comfort in various structures. More specifically, it is an air temperature control system for operating supply fans for reductions in electrical energy consumption.

Since the energy crisis of the early 1970's, commercial structures, i.e., office buildings, retail stores, etc., which have modified their older air handling equipment or installed new equipment, have incorporated systems which are controlled to "load shed" at a predetermined power demand. In a commercial structure having, for example, six air handling units controlled by a load-shedding system to maintain store comfort, up to two of the units may be shed and cycled at any one time to regulate store comfort. These load shedding systems have proved not to be ideal for efficiently maintaining commercial comfort in these types of structures. Since the greatest power demand occurs during the summer, the load shedding system is designed for maximum summer conditions. Thus, during most of the year the flow of conditioned air through the air handling units may, for example, be two and a half times greater than necessary. This increased capacity requires a greater initial equipment investment and increased maintenance costs over the operating life of the system. Further, operation of the load shed system results in heavy belt and motor starter bearing wear caused by the continuous on/off cycling of each of the motors of the air handling units. Moreover, the air flow throughout the system may not be evenly distributed as the individual units load shed. Another not insubstantial problem associated with the load shedding arrangement is air duct noise occurring every time a unit comes on line, which may cause occupants of the structure annoyance. In addition to the load shedding system, further examples of air temperature control systems are described in Sparrow, U.S. Pat. No. 2,805,026; Elwart U.S. Pat. No. 3,454,078; and Denny U.S. Pat. No. 4,007,605. Sparrow relates to a temperature control system for a plurality of znes for a hot air furnace system to be used during the winter to individually control the temperature in each zone. A series of dampers in each zone controls the air flow provided by a continuously operating blower. Elwart discloses a heating and cooling system. When the heating system is used, a variation in resistance varies the intensity of the current in the blower fan circuit thus varying the speed of the blower fan. The Elwart blower in the heating mode is a variable speed device and is operated in conjunction with the furnace, i.e., the fan speed increases as the furnace temperature increases. When the air conditioner mode is in operation, the blower fan is not variable and operates at top speed only. Denny discloses a system for regulating air flow over the outside of condenser units of an air conditioning system. Denny is limited to refrigeration systems and is designed to optimize cooling.

In view of the prior art, there is a need for an air temperature control system that will operate at greater energy savings than present systems of the cycling and shedding type and other types described hereinabove. Further, there is a need for a system where the air flow is evenly distributed throughout the zones of the structure and annoying air duct noise is eliminated. Moreover, there is a need for a system that is equally effective throughout the year, i.e., heating, ventilating or air conditioning.

This invention is directed to a two-speed, two-winding motor control in conjunction with a two-speed, two-winding starter for obtaining reductions in electrical energy consumption. Control is based on fan speed reduction and not demand reduction. The general purpose of this control is to operate temperature conditioning supply fans at low speed or automatic thermostatic two-speed control (high or low), depending on an operator's decision through a selector switch. In either mode of operation, the fan system will operate at a greater energy-savings than present systems including fan cycling and shedding type control.

The subject invention relies on a motor speed reduction from the maximum rated speed of the air handling unit supply fans to supply air through a zone continuously without requiring cycling of the fan. The amount of air delivered by the unit is proportional to the speed of the fan. According to basic fan law, the reduction in horsepower, due to a reduction in fan speed, is proportional to the third power of the fan speed variation. In mathematical terms, the relationship may be expressed as follows:

$$[HP_1/HP_o] = [Q_1/Q_o]^3 \qquad \text{(Equation 1)}$$

Where $HP_o$ is the initial horsepower, $HP_1$ is the reduced horsepower, $Q_o$ is the corresponding initial fan speed and $Q_1$ is the corresponding new reduced fan speed. For example, if the supply fan is operated at $\frac{2}{3}$ of the rated maximum speed of the fan, the corresponding reduced horsepower required to operate the fan, according to Equation 1, is:

$$[HP_1/HP_o] = [2/3]^3 = 8/27$$

Thus, the horsepower requirement to operate the fan at two-thirds speed is equal to approximately 30% of that required at full speed. Considering six similar air handling units in a structure, the horsepower savings described in Equation 1 would be proportionately increased. None of the prior art disclosures known by applicant are concerned with a reduction in energy consumption. Large savings in electric power consumption, as compared to the devices in the prior art, yet still allowing for optimum performance during peak season, i.e., summer, is accomplished by the subject invention.

In a specific embodiment of the invention, each zone of the structure includes temperature sensing bulbs for determining the ambient temperature in the zone and a thermostat for selecting a desired zone temperature. A plurality of damper motors controlling corresponding outside air dampers supply air into the zone for ventilation purposes, and whenever possible, to minimize the use of mechanical air cooling apparatus and consequently reducing energy consumption, outside air is brought into the zone in an attempt to cool the zone to the desired temperature. A heating coil, supplied by a hot water pump, during the heating season and a cooling coil, supplied by chilled water, during the cooling season temperature conditions the supplied air. A pneumatic control system which is responsive to the temperature selecting and temperature sensing means selectively actuates the heated, cooled or ventilated air supplied in the zone. A two-speed supply fan circulates the supplied air received through the outside air dampers and the conditioned air from the heating and cooling coils to the zone. The supply fan is controlled by the pneumatic control means to operate in a first state only at low speed, i.e., at two-thirds the rated maximum speed of the motor, to reduce energy consumption, or in a second state at automatic thermostat two-speed control (high or low). The fan in this second state operates at low speed except when maximum cooling is required and then automatically switches back to low speed operation from high speed when the ambient temperature in the zone approaches the desired temperature.

A starter having two windings is coupled to a set of corresponding motor windings for activating the supply fan. The two motor windings correspond to the high and low speeds of the fan. The use of the two-winding starter in conjunction with the two-speed two-winding motor control for the fan provides for an efficient transfer of energy and reduced energy consumption.

DETAILED DESCRIPTION

Figure 1:
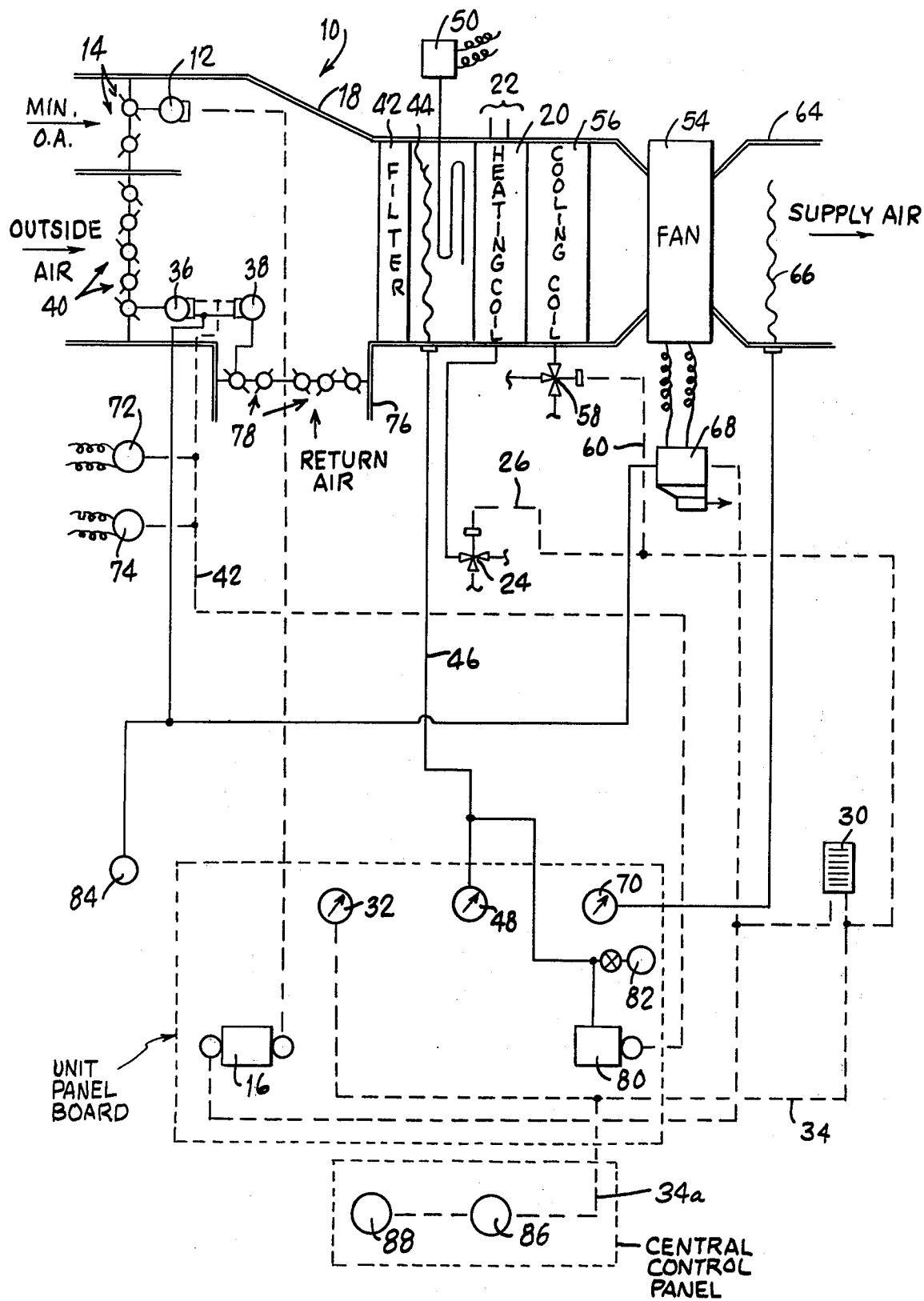
FIG. 1 is a partly schematic and partly block diagram of a pneumatic control system in accordance with the invention.

FIG. 1 illustrates schematically the pneumatic control portion of the invented air temperature control system. The duct portion of the system is generally shown at 10.

For the sake of convenience, the operation of the control system in one zone will be described, as the operation in each zone is similar. A damper motor 12 is connected to minimum outside air dampers 14 to allow air from outside the structure to be brought into each zone for ventilation purposes. A fixed quantity of outside air, determined by the setting of gradual switch 16, is brought into the structure through input duct 18, whether the system is operating in the heating or cooling mode. When the system is initially turned on, damper motor 12, controlled by the gradual switch 16, is automatically activated to open up the dampers 14. A typical setting of the switch 16 may be 50% which opens the dampers 14 halfway to the outside air. A heating coil 20 receives hot water from a hot water pump 22 to produce heated air in the zone during the heating season. The inlet to the hot water pump 22 is controlled by a three-way, pneumatically controlled valve 24 having three ports, i.e., a common, normally open and normally closed port. The hot water valve 24 is controlled by the pressure in pneumatic control line 26 such that at 4 lb/ft$^2$ (hereafter abbreviated to "lb") pneumatic pressure, the hot water valve 24 is completely open to allow hot water from pump 22 to be delivered to the heating coil. At 8 lb pressure in control line 26, the valve 24 is closed such that the pump 22 provides no hot water to the heating coil 20, thus effectively shutting down the heating function. When the pressure in control line 26 is between 4 and 8 lb, the valve 24 is partially open to allow a proportionate amount of hot water to be delivered to the heating coil 20 from the pump 22. The pneumatic pressure in the control lines including line 26 is controlled by a direct acting zone thermostat 30. As the ambient temperature in the zone increases, a corresponding increase in the pneumatic pressure is emitted by the theromstat 30 to the control lines throughout the zone. Accordingly, when the temperature in the zone decreases, a corresponding decrease in the pneumatic pressure in the control lines occurs. A control pressure gauge 32, mounted on the air handling unit panel board, displays via control line 34, the pressure emitted from the zone thermostat 30.

A pair of damper motors 36 and 38 control a plurality of outside air dampers 40 to allow outside air into the system. Whenever possible, normally when the outside air temperature is below 55° to 60° F., to minimize the use of the mechanical chilled water air cooling portion of the system and thereby reduce energy consumption, outside air is first brought into the system in an attempt to cool the zone to the desired temperature. The damper motors 36 and 38 are unenergized through 8 lb pneumatic pressure, i.e., the dampers 40 are closed to outside air. When the pressure in control line 42 exceeds 8 lb, the damper motors 36 and 38 are activated to open the dampers 40 a corresponding proportionate amount such that when the pressure reaches 13 lb in control line 42 the dampers 40 are completely open to allow the maximum outside air into the structure. The outside air entering the input duct 18 through the dampers 40 and dampers 14 is filtered by filter 42 and passed by the bulb 44 which is responsive to the entering air temperature. The bulb 44 is connected via line 46 to a temperature gauge 48 on the unit panel board. The filtered air also passes through a low limit thermostat 50 which is wired to a relay holding coil of the supply fan 54 and set at 45° F. The low limit thermostat 50 stops the fan 54 upon a drop in air temperature below the fan's set point, i.e., 45° F. A cooling coil 56, controlled by a three-way valve 58, provides cooled air in the zone when required by the ambient conditions. The coil 56 is provided with chilled water (not shown) passing through the valve 58. The valve 58 is closed to the chilled water through 13 lb pneumatic pressure. When the pressure in control line 60, controlled by thermostat 30, exceeds 13 lb, chilled water passes through the cooling coil 56 in proportionately increasing amounts. At 17 lb pressure in control line 60, the maximum amount of chilled water is provided to the cooling coil 56 as the valve 58 is opened completely.

The two-speed supply fan 54 circulates the supplied air received from the outside air dampers 40, and the conditioned air from the heating coil 20, or the cooling coil 56 through the supply conduit 64 in the zone. With respect to the specific embodiment described herein, the supply fan 54 operates at a maximum rated speed of 1800 RPM. A reduced speed of the supply fan 54 operates at 1200 RPM, two-thirds of the maximum rated speed. As previously discussed hereinabove, operating the fan 54 at two-thirds of rated speeds requires only 30% of the horsepower at maximum rated speed. The fan 54 is connected to exhaust port 68 so that when the system and the fan 54 are shut down, for example, at night, the port 68 exhausts any remaining pressure in the control lines to allow for proper operation of the pneumatic system when the system is next started up. A bulb 66 in the supply conduit 64 measures the temperature of the conditioned air supplied to the zone by the fan 54. The temperature recorded by bulb 66 is displayed on the unit panel board at gauge 70. To avoid pressurization, a pair of pneumatic electric switches 72 and 74 activate relief exhaust fans (not shown) to exhaust a part of the air circulated through the conduit 64, which is initially brought into the structure for ventilating purposes, out of the structure. The conditioned air supplied to the zone via conduit 64 which is not exhausted out of the system by the exhaust fans is recirculated and returned to the input duct 18 via return duct 76 and dampers 78 which are controlled by the damper motors 36 and 38. The outside air entering through ducts 14 and 40 and the return air through duct 78, are controlled by damper motors 12 and 36 and 38, respectively, and are mixed at input duct 18 and recirculated. A mixture controller 80 which is responsive to the bulb 44, measuring the mixture temperature, is set to maintain the desired mixture temperature called for in the zone by controlling the damper motors 36 and 38 and 12 which in turn control the opening of the dampers 40 and 14 for allowing outside air to enter into the zone, and dampers 78 for the return air through the system to be suitably mixed. Control pressure devices 82 and 84 are sources of direct 20 lb pressure which are required by the pneumatic controls to operate properly. The high pressure devices 82 and 84 are also used to maintain proper operating conditions when the system is to be operated under low pressure.

An operator controlled "off-on" switch 86 selects the mode of operation of the supply fan 54, i.e., whether the fan 54 will operate only at low speed, at two-thirds the rated maximum of the motor to reduce energy consumption or at automatic thermostat two-speed control (high or low). When the switch 86 is in the "off" position, i.e., automatic thermostat control, a pneumatic electric switch 88 determines whether high or low speed motor action is required. The switch 88 is a two-contact switch, one contact normally open and the other normally closed, which is controlled through pneumatic line 34a by zone thermostat 30; the switch 88 is only operative when switch 86 is in the "off" position. At 16 lb pressure, switch 88 is in the make condition to allow the high speed motor of the fan 54 to become operative and operate at 1800 rpm. At this point, the cooling coil 56 is receiving almost the maximum available quantity of chilled water through the valve 58 to provide maximum cooling in the zone. If the pneumatic pressure in line 34a decreases to 14 lb pressure, a 2 lb differential, due to a decrease in the ambient zone temperature as reflected by the thermostat 30, the make contact switch 88 is broken, automatically allowing the fan to resume operation at the low speed for reduced energy consumption. When the switch 86 is in the "on" position, the pneumatic switch 88 is inoperative. The fan 54 therefore operates only at low speed and cannot switch to the high speed motor portion thereof to reduce energy consumption. The switches 86 and 88 are both located on the central control panel along with other switches for appropriate control of all the zones of the system.

In operation, if heating is required, the pressure in control line 26 will start decreasing in response to the thermostat 30, and the valve 24 will open up proportionately until 4 lb pneumatic pressure is reached to provide heating coil 20 with hot water from pump 22. When less heating is required, the pressure in line 26 will start increasing. As the pressure reaches 8 lb, valve 24 will be closed. At pneumatic pressures greater than 8 lb, a changeover takes place such that the dampers 40 are opened to allow outside air into the zone for cooling purposes. Further increase in pressure from 8 to 13 lb opens the outside air dampers 40 until they are wide open. If the pressure continues to rise past 13 lb, the pneumatic control determines that the zone cannot obtain any further beneficial cooling from the outside air and the outside dampers 40 are closed. Further, the chilled water valve 58 starts to open up to bring in chilled water to operate the cooling coil 56. As the ambient temperature in the zone continues to increase, the control pressure continues to increase until at 17 lb pressure the valve 58 is wide open. During the low pressure operation, i.e., heating and ventilating, the fan 54 is operating at low speed. However, at approximately 16 lb pressure, if the switch 86 is in the "off" position, a switch to high speed fan operation takes place. Further, if the temperature in the zone begins to drop, as it should with the maximum cooling operating through the higher air volume provided at high speed and the wide open valve 58, then at a 2 lb differential in the switch 88, i.e., 14 lb pressure, the fan 54 will return to low speed operation.

Figure 2:
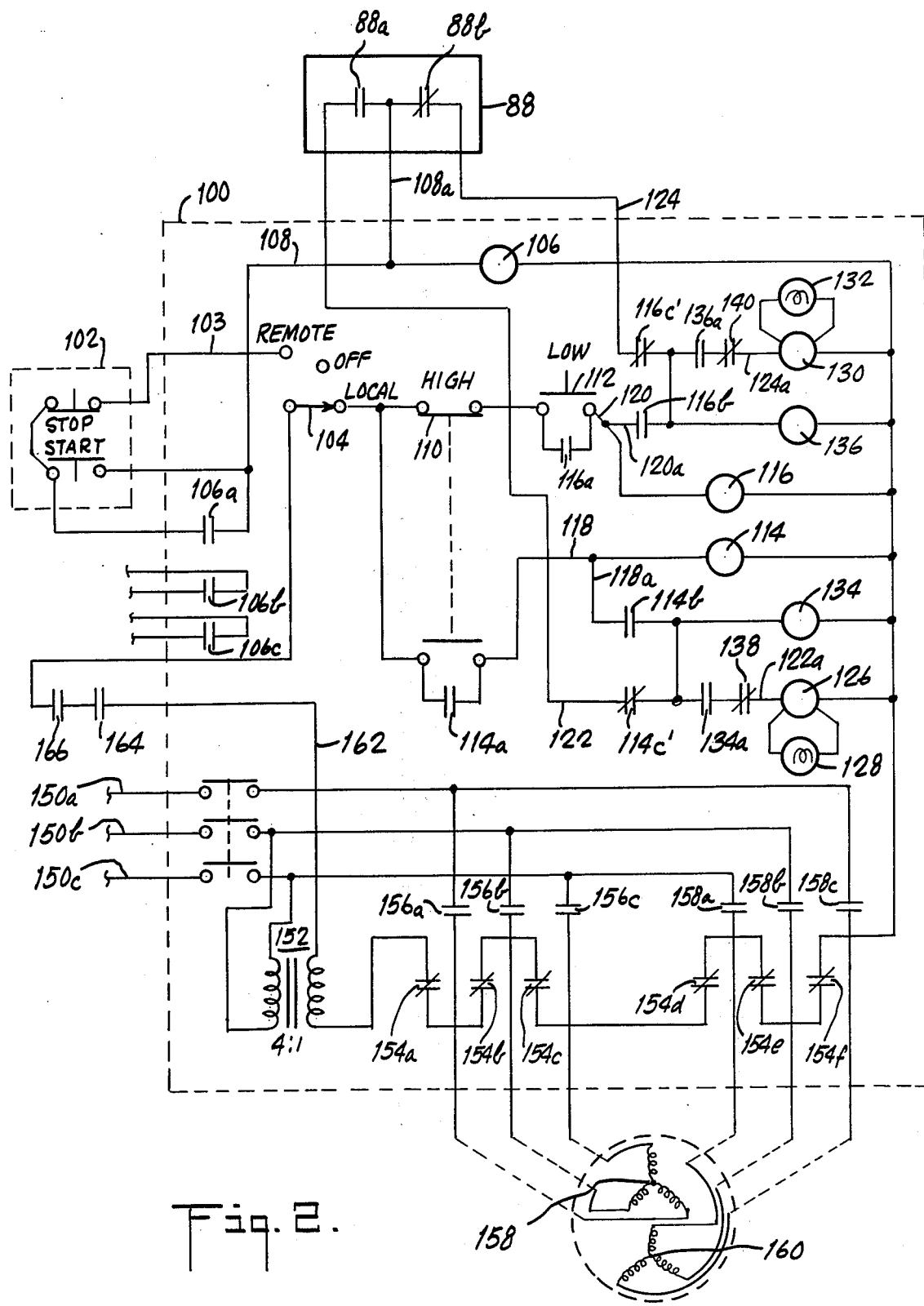
FIG. 2 is a circuit diagram of the electric controls of the invented system.

Referring to FIG. 2, a circuit diagram of the electric controls for the subject invention is illustrated where a two-speed two winding starter is shown generally at 100 within the dotted lines. A start-stop pushbutton 102, located on the central control panel completes a circuit to start the electric power flowing through the air handling unit. A three position switch 104 having a remote, local, and off position, is connected through line 103 to the start-stop button 102 when in the remote position. The remote position allows for operation of the pneumatic electric switch 88 to automatically select the appropriate speed of fan 54 when switch 86 is in the "off" position. The local position of switch 104 bypasses automatic control of the fan operation to allow the operator to manually select the speed of the fan 54, either high or low, desired. When the switch 104 is in the off position the entire control system is de-energized. A relay holding coil 106 is connected through line 108 to the start-stop button 102. A set of contacts 106a across the start position of the pushbutton 102, corresponding to the coil 106, maintains an electrically held contact across the pushbutton 102 when the system is initially energized. A further set of contacts 106b also corresponding to holding coil 106 operates as an interlock for the pneumatic control system described hereinabove with reference to FIG. 1. Until the fan 54 is energized at system initialization the pneumatic controls remain unenergized. Specifically, interlock contacts 106b, when closed, provide power to exhaust port 68 (FIG. 1) for developing the necessary pneumatic pressure into the system. Another set of contacts 106c also corresponding to the coil 106 acts as an interlock to allow operation of the relief fans that exhaust air out of the zone. The contacts 106c are connected to the pneumatic electric switches 72 and 74 (FIG. 1).

The pneumatic electric switch 88 is connected to the pushbutton 102 through lines 108 and 108a, and includes two contacts, one normally open 88a and one normally closed 88b. The normally open contact 88a is the high speed contact while the normally closed contact 88b is the low speed contact. The determination of which contacts, i.e., 88a or 88b, are operative at any particular time is performed by the pneumatic controls through zone thermostat 30 as previously described hereinabove.

When switch 104 is in the local position, the starter 100 can be energized by a high speed momentary contact pushbutton 110 or low speed momentary contact pushbutton 112 which are physically located on the starter unit. A relay holding coil 114 is connected through line 118 to the high speed pushbutton 110. A pair of contacts 114a, corresponding to the coil 114, across the pushbutton 110 maintains an electrically held contact across the pushbutton 110 after it is released. Similarly, a relay holding coil 116 is connected through line 120 to the low-speed pushbutton 112. A pair of contacts 116a, corresponding to the coil 116, across the pushbutton 112 maintains an electrically held contact across the pushbutton 112 after it is released. Additional contacts 114b connected to the high speed pushbutton 110 through lines 118 and 118a and contacts 114c' (normally closed) connected through line 122 to contact 88a also correspond to the coil 114. In a like manner, additional contacts 116b connected to the low speed pushbutton 112 through lines 120 and 120a, and contacts 116c' (normally closed) connected through line 124 to contact 88b correspond to coil 116.

A high speed holding coil 126 and a low speed holding coil 130 of the starter 100 provide the necessary energization for the two desired fan speeds of the device. Pilot lights 128 and 132 indicate when the high speed coil 126 and low speed coil 130, respectively, are energized. Time delay relays 134 and 136 connected to high speed pushbutton 110 and low speed pushbutton 112 through lines 118 and 120, respectively, provide a one second time delay prior to energization of their coils. Contacts 134a and 136a corresponding to the coils 134 and 136 are positioned in lines 122a and 124a, respectively, and block the energization of the starter holding coils 126 and 130 for one second as a safety precaution so that both coils are not energized simultaneously. Auxiliary contacts 138, corresponding to the low-speed portion of the motor, which are normally closed, and positioned in line 122a, is an additional safety feature such that if the low speed portion of the motor is still energized, contacts 138 will not allow the high speed coil 126 to become energized. Similarly, auxiliary contacts 140 corresponding to the high speed portion of the motor, which are normally closed, and positioned in line 124a, will not allow the low speed coil 130 to become energized if the high speed portion of the motor is energized.

External three-phase power at 480 volts is brought into the starter 100 through lines 150a, 150b and 150c. Two of the three phases of the external power, 150b and 150c, are connected to the primary of a transformer 152. The transformer 152 has a 4:1 turns ratio, thus providing 120 volts output at the secondary. The secondary of transformer 152 is connected to a set of normally closed contacts 154a to 154f which open if an overload condition exists in any of the phases of either of the motor windings 158 and 160. Thus, for example, if there is an overload in phase 154a of the motor winding 158, the control portion of the starter breaks allowing no power to go to the other two phases 154b and 154c. Contacts 156a, 156b, and 156c are connected through an electromechanical interlock with high speed starter coil 126 such that when the coil 126 is energized the contacts 156a, 156b, and 156c are mechanically closed so that power at 480 volts is brought in through the respective lines 150a, 150b, and 150c to energize the high speed winding 158 of the motor. Similarly, contacts 158a, 158b and 158c are connected to the low speed starter coil 130 to bring in the three-phase power at 480 volts through the power lines 150a, 150b, and 150c to energize the low speed winding 160 of the motor. The starter coils or windings 126 and 130 are electrically matched to the motor windings 158 and 160, respectively, so that maximum efficiency is obtained. The secondary of the transformer 152 is connected on its other side through line 162 to contacts 164 and 166. The contacts 164 are for a safety interlock connected to a smoke detector. If there is any smoke in the zone, contact 164 is broken and the control circuit is opened. The contacts 166 are also for a safety interlock to detect, during the winter months, if the outside air dampers 40 are inoperative and wide open. Specifically, if bulb 44 detects below-freezing air entering the zone, contacts 166 are broken and the control circuit is opened.

In operation, first assuming that switch 104 is in the remote position, the start button 102 is pressed momentarily and power enters through the start button of the remote mounted pushbutton from the secondary of transformer 152 through line 108 and energizes holding coil 106. After coil 106 is energized, power proceeds through line 108 and through the contacts 154f to 154a which until this point in time should all be normally closed. The power proceeds through the 120 volt secondary of transformer 152 and goes through safety interlocks 164 and 166. Thus, at the outset when the pushbutton 102 is pressed, the system is started by bringing in all the interlock contacts and energizing the holding coil 106. The contacts 106a across the start button 102 hold the momentary starter button in electrically. In the next phase of control after the holding coil 106 is energized, although occurring almost simultaneously with the operation hereinabove described, power flows through line 108a to the pneumatic electric switch 88. Further assuming that the normally closed contacts 88b are the operative contacts at the moment, the power travels from switch 88 through line 124 to normally closed contacts 116c'. While power is unable to proceed through time delay contacts 136a, the power does proceed to energize the time delay holding coil 136. The time delay relay 136 delays for one second the power from energizing the low speed holding coil 130. After the one second time delay, contacts 136a are operative and power flows to the normally closed high speed auxiliary contacts 140 which at this instance are assumed in the make condition, thus allowing power to energize the low speed holding coil 130. The low speed holding coil 130 mechanically brings in contacts 158a, 158b, and 158c thus permitting the line power through lines 150a, 150b, and 150c to energize the low speed winding 160 of the motor.

With respect to the operation of the high speed portion of the motor winding, assuming that the zone thermostat 30 (FIG. 1) forces the pneumatic electric switch 88 to enter into high speed operation, the normally open contact 88a becomes operative. Power travels from switch 88 through line 122 to normally closed contact 114c'. While power is unable to proceed through the time delay contacts 134a, the power does proceed to energize the time delay holding coil 134. The time delay relay 134 delays for one second the power from energizing the high speed holding coil 126. After the one second time delay, contacts 134a are operative and power flows to the normally closed low speed auxiliary contacts 138, which in this instance is assumed in the make condition, thus allowing power to enter the high speed holding coil 126. The high speed holding coil 126 mechanically brings in contacts 156a, 156b, and 156c, thus permitting the line power through lines 150a, 150b, and 150c to energize the high speed winding of the motor 158.

Assuming that switch 104 is in the local position thereby bypassing any external control, the operator must select either low or high speed for the starter 100. Further assuming the low speed momentary contact button 112 is pressed, power from the secondary of transformer 152 is transferred through line 162 across that button. Power is transferred through line 120 to energize relay holding coil 116 which in turn brings in contacts 116a in parallel with the low speed button 112 to electrically maintain the contact. Further, contacts 116b allow the power to go through line 120a. Power then travels through time delay holding coil 136, providing a one second delay from the time the button 112 is pressed, to the time the power energizes the coil 130. After the one second delay, contacts 136a are operative and power enters the normally closed high speed auxiliary contacts 140, thus allowing power to enter the low speed holding coil 130. At the same time, contacts 116c' which are normally closed disconnect the automatic control from the circuit.

Assuming the high speed momentary contact pushbutton 110 is pressed, power from the secondary of transformer 152 is transferred through line 162 across the button. Power is then transferred through line 118 to energize relay holding coil 114 which in turn brings in contacts 114a in parallel with the high speed button 110 to electrically maintain the contact. Further, contacts 114b allow the power to go through line 118a. Power then travels through time delay holding coil 134, providing a one second delay from the time the button 110 is pressed and the time power enters the motor 158. After the one second delay, contacts 134a are operative and power enters the normally closed low speed auxiliary contacts 138 and high speed holding coil 126. At the same time, contacts 114c' which are normally closed disconnect the automatic control from the circuit.

We claim:

1. An energy-saving system for maintaining air temperature comfort in a zone of a structure comprising:
   means for sensing the ambient temperature in the zone;
   fan means for supplying air into the zone;
   means for temperature conditioning the supplied air;
   starter means for starting said fan means and having a high speed coil and a low speed coil;
   two-speed motor means for driving said fan means to distribute the conditioned and supplied air in the zone, said motor means having a high speed and a low speed winding; and
   control means for selectively coupling said high speed and said low speed winding to the corresponding one of the starter means coils to produce two fan driving speeds, each exceeding at least one-half of the rated maximum speed of the fan means, said control means being responsive to the temperature sensing means for separately actuating the temperature conditioning and having a selectable first operational state wherein irrespective of the temperature sensing means the low speed starter means coil and the corresponding motor means winding are energized to produce said low fan speed, with said low fan speed being less than the rated maximum speed of the motor so as to reduce energy consumption of the system, and a selectable second operational state wherein the high speed starter means coil and the corresponding motor means winding are energized to produce said high fan speed in response to the temperature sensing means irrespective of energy consumption, and automatic switching from the high fan speed to the low fan speed occurs when the ambient temperature sensed drops below a preselected temperature.

2. A system as in claim 1 wherein the starter means coils are each efficiently matched to the corresponding motor winding.

3. In a system for controlling air temperature in one or more zones within a structure, utilizing a supply fan for each of the zones, the energy-saving improvement comprising:
   means for sensing ambient temperature conditions in at least one zone;
   means for admitting air into said zone;
   means for temperature conditioning the air admitted into said zone;
   two-speed, two-winding motor means for driving the supply fan for said zone to distribute the admitted and conditioned air in said zone and having a high speed substantially at its rated maximum speed and a low speed substantially two-thirds of its rated maximum speed; and
   control means for controlling said motor means and comprising first means for actuating said motor means to drive said supply fan at said low speed irrespective of the operation of said temperature conditions sensing means and said temperature conditioning means, and second means, responsive to said temperature conditions sensing means, for actuating said motor means to drive said supply fan at the low speed except when the temperature conditions in said zone exceed a preset value during which period said motor means is actuated to drive said supply fan at the high speed irrespective of the operation of said temperature conditioning means.

4. A system as in claim 3 wherein said control means comprises starter means having two coils for starting said motor means, and said motor means comprises two windings respectively coupled to said starter means coils for respectively driving said supply fan at the high and low speeds.

5. A system as in claim 4 wherein said temperature conditions sensing means comprises means for producing pneumatic pressure signals indicative of the temperature conditions in said zone.

6. A system as in claim 5 wherein said second means further comprises pneumatic switching means electrically interlocked with said starter means for preventing the operation of one of said two coils when the other coil is energized, said switching means being responsive to a pneumatic pressure signal from said temperature conditions sensing means such that as the zone temperature increases beyond said preset value a corresponding increase in the pneumatic pressure will energize the starter means coil to operate said motor means at high speed, and conversely as the temperature decreases, a corresponding pressure decrease will deenergize said high speed coil and energize the low speed coil.

7. A system as in claim 4 wherein said
   first means produces a first operational state wherein the starter means coil and the corresponding motor means winding for low fan speed are selected, so that said fan speed is less than the rated maximum speed of said motor means to reduce energy consumption of the system; and
   said second means produces a second operational state wherein the starter means coils and corresponding motor means windings and fan speeds are selected in response to signals from the temperature conditions sensing means irrespective of energy consumption.

8. A system as in claim 6 wherein said control means further comprises selector switch means for selecting between control by said first means or control by said second means.

9. In a system for controlling air temperature in one or more zones within a structure, utilizing:
- a supply fan for each of the zones;
- means for sensing ambient temperature conditions in each of the zones;
- means for admitting air into each of the zones;
- means for temperature conditioning the air admitted into each of the zones;

the improvement comprising:
- two speed motor means for driving each of said supply fans and having a high speed winding which produces a fan speed substantially at the rated maximum for said fan and a low speed winding which produces a
- fan speed substantially at two-thirds the rated maximum of said fan; and
- control means, responsive to a signal from said temperature sensing means, for controlling the speed of said motor means, said control means comprising:
  - starter means for energizing said motor means and having a high speed coil and a low speed coil respectively efficiently matched and coupled to said high and low speed windings; and
  - switch means for actuating said starter means to energize only said low speed winding through said low speed coil to drive said fan means at said low speed, and for actuating said starter means to energize both said low speed and said high speed windings but energizing said high speed winding through said high speed coil to drive said fan means at said high speed only when the signal from the temperature sensing means indicates a temperature in said zone above a predetermined level and irrespective of the operation of said temperature conditioning means.

10. A system as in claim 9 wherein said switch means comprises:
- first means for producing a first operational state wherein the starter means coil and the corresponding motor means winding for low fan speed are energized and maintained so that said motor means only operates at low speed to reduce energy consumption of the system; and
- second means for producing a second operational state wherein the starter means coil and corresponding motor means winding for high fan speed are energized in response to signals from the temperature sensing means irrespective of energy consumption, said second means comprising means for automatically switching said motor means from the low fan speed to the high fan speed when the signal from the temperature sensing means indicates a temperature in said zone above a preselected level.

* * * * *